United States Patent [19]
Chiang et al.

[11] Patent Number: 5,835,725
[45] Date of Patent: Nov. 10, 1998

[54] DYNAMIC ADDRESS ASSIGNMENT AND RESOLUTION TECHNIQUE

[75] Inventors: Steve Tsowen Chiang, Foster City; Joseph S. Lee, Fremont, both of Calif.

[73] Assignee: Cisco Technology, Inc., San Jose, Calif.

[21] Appl. No.: 734,496

[22] Filed: Oct. 21, 1996

[51] Int. Cl.$^6$ .................................................. G06F 13/00
[52] U.S. Cl. ............................... 395/200.58; 395/200.75
[58] Field of Search ..................... 395/200.16, 200.75, 395/200.58

[56] References Cited

U.S. PATENT DOCUMENTS

| 4,679,189 | 7/1987 | Olson et al. | 370/396 |
| 5,247,620 | 9/1993 | Fukuzawa et al. | 395/200.75 |
| 5,526,489 | 6/1996 | Nilakantan et al. | 395/200.58 |

OTHER PUBLICATIONS

End System Routing Information Exchange Protocol for use in conjunction with ISO 8878; ISO 10030, 1995.

*Primary Examiner*—Krisna Lim
*Assistant Examiner*—Kenneth R. Coulter
*Attorney, Agent, or Firm*—Cesari and McKenna LLP

[57] ABSTRACT

An address resolution protocol technique enables an intermediate station of a heterogeneous network to dynamically assign an address to an end station for use in a communication session between the end station and other stations of the network. The end station initiates the session by issuing a novel address assignment request to the intermediate station. In response to the request, the intermediate station assigns the end station an address chosen from a pool of addresses allocated to the intermediate station. If the assigned address is unacceptable, the end station reissues the address assignment request to which the intermediate station allocates another address from the pool.

23 Claims, 6 Drawing Sheets

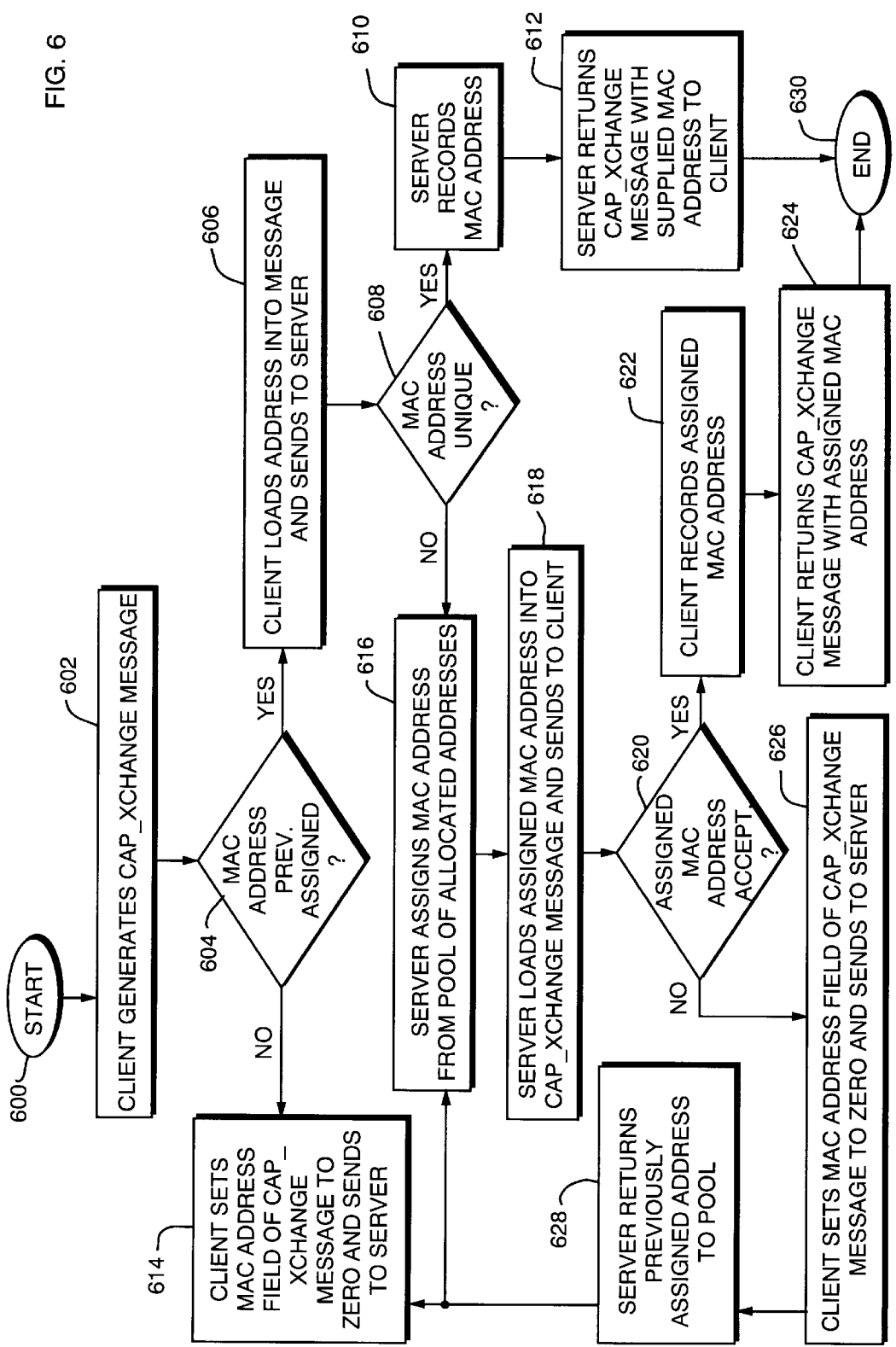

DYNAMIC ADDRESS ASSIGNMENT AND RESOLUTION TECHNIQUE

FIELD OF THE INVENTION

The invention relates to computer networks and, more particularly, to the assignment and resolution of addresses dynamically allocated to stations of a heterogeneous computer network.

BACKGROUND OF THE INVENTION

A computer network is a geographically distributed collection of communication links and subnetworks interconnected by intermediate stations, such as routers, for transporting data between end stations coupled to the network. A local area network (LAN) may be an example of such a subnetwork consisting of a transmission medium, such as coaxial cable or twisted pair, that provides relatively short distance communication among the interconnected stations. Communication links, on the other hand, may take the form of wide area networks (WANs), such as public or private telecommunications facilities, and dial-up lines of a switched telephone network that connect stations to the network via modems. The stations typically communicate by exchanging discrete packets or frames of data according to predefined protocols. In this context, a protocol consists of a set of rules defining how the stations interact with each other.

Most networks are typically organized as a series of hardware and software levels or "layers" within each station. These layers interact to format data for transfer between, e.g., a source station and a destination station communicating over the network. Specifically, predetermined services are performed on the data as it passes through each layer and the layers communicate with each other by means of the predefined protocols. This layered design permits each layer to offer selected services to its higher layers using a standardized interface that shields those layers for the details of actual implementation of the services.

Modern communications architectures are organized as such layered designs. Whereas the lower layers of these architectures are generally standardized and, typically implemented in hardware and firmware, the higher layers are generally implemented in the form of software running in the stations attached to the network. Examples of such communications architectures include Novell Inc.'s NetWare architecture, Apple Computer Inc.'s AppleTalk architecture and the Internet communications architecture.

The Internet architecture is represented by four layers which are termed, in ascending interfacing order, the network interface, internetwork, transport and application layers. These layers are arranged to form a protocol stack in each communicating station of the network. FIG. 1 illustrates a schematic block diagram of prior art Internet protocol stacks 125 and 175 used to transmit data between a source station 110 and a destination station 150, respectively, of a LAN environment 100. As can be seen, the stacks 125 and 175 are physically connected through a communications channel 180 at the network interface layers 120 and 160. For ease of description, the protocol stack 125 will be described.

In general, the lower layers of the communications stack provide internetworking services and the upper layers, which are the users of these services, collectively provide common network application services. The transport layer 114 serves as the boundary between the network-specific elements and the application-specific elements. The transport layer's fundamental service is to move a user's data from its source to its destination over a communication path using the internetwork subsystem. To do this effectively, the transport service operates end-to-end whether the path is over a single subnetwork or across multiple interconnected subnetworks.

The application layer 112 provides services suitable for the different types of applications using the network such as terminal connections, electronic mail, the Simple Mail Transfer Protocol and the File Transfer Protocol. The lower network interface layer 120 of the Internet architecture accepts industry standards, such as IEEE standard 802, which defines a flexible network architecture oriented to the implementation of LANs.

Specifically, the IEEE approach addresses LAN protocols that occupy physical and datalink sublayers of layer 120. The physical layer 126 is concerned with the actual transmission of signals across the communication channel and provides what is usually referred to as the "wire" between two nodes and a network. In this context, the physical layer defines the types of cabling, plugs and connectors used in connection with the channel.

The datalink layer, on the other hand, is responsible for transmission of data from one station to another. In the IEEE 802 architecture, the datalink layer is divided into two sublayers: Logical Link Control (LLC 122) and Media Access Control (MAC 124). The LLC sublayer 122 manages communications between devices over a single link of a network to allow the overlying internetwork layer access to the services of the LAN without regard to the actual network implementation. More specifically, the LLC layer provides for environments that need connectionless or connection-oriented services at the datalink layer.

The MAC sublayer 124 is primarily concerned with controlling access to the transmission medium in an orderly manner and, to that end, defines rules or procedures by which the stations must abide in order to share the medium. In order for multiple stations to share the same medium and still uniquely identify each other, the MAC sublayer defines a hardware or datalink address called the MAC address. This MAC address is unique for each station interfacing to a LAN. The MAC layer further provides framing functions including the addition of header and trailer information needed to identify the boundaries of frames to synchronize communication between source and destination stations.

The functions provided at these lowest sublevels are generally standardized and most LAN implementations are in accord with one of three IEEE LAN standards: IEEE 802.3 carrier sense multiple access with collision detection (CSMA/CD,); IEEE 802.4 token bus; or IEEE 802.5 token ring. For example, Ethernet is a LAN architecture that uses CSMA/CD for media access control.

The primary network layer protocol of the Internet architecture is the Internet protocol (IP) contained within the internetwork layer 116. IP is primarily a connectionless network protocol that provides internetwork routing, fragmentation and reassembly of datagrams and that relies on transport protocols for end-to-end reliability. An example of such a transport protocol is the Transmission Control Protocol (TCP) contained within the transport layer 114. Notably, TCP provides connection-oriented services to the upper layer protocols of the Internet architecture. Although the two protocols TCP and IP are but two of the building blocks required for the complete Internet communications architecture, the term TCP/IP is commonly used to refer to this architecture.

Connection-oriented services generally involve three distinct phases: connection establishment, data transfer and connection termination. During connection establishment, a single path is found between the source and destination stations. Once the connection has been established, data is transferred sequentially over that established path and, when the connection is no longer needed, the path is terminated. As described more fully herein, the transport layer 114 and the internetwork layer 116 are substantially involved in providing predefined sets of services to aid in connecting the source station to the destination station when establishing application-to-application communication sessions.

Data transmission over the LAN 100 therefore consists of generating data in, e.g., sending process 104 executing on the source station 110, passing that data to the application layer 112 and down through the layers of the protocol stack 125, where the data are sequentially formatted as a frame for delivery onto the channel 180 as bits. Those frame bits are then transmitted over an established connection of channel 180 to the protocol stack 175 of the destination station 150 where they have passed up that stack to a receiving process 174. Data flow is schematically illustrated by solid arrows.

Although actual data transmission occurs vertically through the stacks, each layer is programmed as though such transmission were horizontal. That is, each layer in the source station 110 is programmed to transmit data to its corresponding layer in the destination station 150, as schematically shown by dotted arrows. To achieve this effect, each layer of the protocol stack 125 in the source station 110 typically adds information (in the form of a header field) to the data frame generated by the sending process as the frame descends the stack. At the destination station 150, the various encapsulated headers are stripped off one-by-one as the frame propagates up the layers of the stack 175 until it arrives at the receiving process.

As noted, a router may be used to interconnect LANs or other communication links to extend the effective size of the network. The router's primary function in this context is to determine the next station to which the data is sent; this routing function is preferably performed by the internetwork layer on a defined packet format within each routing station. That is, when the internetwork layer receives a packet from the transport layer for transmission over the network, it encapsulates the packet with a header containing, inter alia, source and destination IP addresses.

Point-to-point (PPP) is a wide area, datalink protocol used by routers that allows IP (and other higher layer communication architecture protocols) to be carried over point-to-point connections. PPP can operate over generally any serial link interface between a router and station that is dials into an IP network, such as a TCP/IP system, provided the station has a valid IP address. PPP has a negotiation phase that allows a calling station to determine an acceptable IP address for that connection. Access to packet-switched public data networks may be further achieved through a X.25 network interface configured to provide reliable, point-to-point connections between the router and station. X.25 networks are also used to interconnect to a variety of communications architectures because of their transparent remote access capabilities.

A vendor-developed network architecture in widespread use is the Systems Network Architecture (SNA) developed by International Business Machines Corporation. SNA is a mainframe-oriented network architecture that also uses a layered approach. The services included within this architecture are generally similar to those defined in the various communications architectures, although local area networks typically do not conform completely to the SNA architecture. However, SNA is significant to LAN technology because a LAN must often connect to, and be made a logical part of, a SNA mainframe network. Access to the LAN is typically shared among the stations in accordance with various access control methods depending upon the topology of the subnetwork and the type of transmission control employed.

One common subnetwork topology is a ring network that is typically formed by configuring the communication channel as a loop in coupling the is station at intervals around the loop. The stations communicate by transmitting and receiving discrete signals in the form of data frames according to pre-defined protocols. Acceptance of a frame by each station, in turn, is determined on the basis of a MAC address contained in the frame. With LANs that employ a ring topology, a commonly used access control method is token passing. A token ring network is an example of a ring topology that uses token passing as an access control method.

A traditional SNA network typically comprises a host processor station coupled to a token ring network by way of a communications controller called a Front-End Processor (FEP). The FEP is an intelligent system dedicated to the control of communication lines and devices, and typically attaches to the channels of the host station to accept data for transmission to the appropriate devices. An example of such a device is a Physical Unit (PU), which is a component that monitors an end station's resources. The PU may communicate with the FEP/host using a MAC address in connection with an end-to-end route established by, e.g., conventional source routing techniques. Alternatively, the PU and FEP/host may be arranged in a Synchronous Data Link Control (SDLC) environment that specifies SDLC addresses. SDLC is the preferred link-level protocol for SNA networks configured as either point-to-point or point-to-multipoint environments.

The SNA network may be transformed to a heterogeneous network environment when a router and an IP-type network is introduced between is the PU and FEP/host station. Here, the PU device is typically emulated as a workstation and communication between the workstation and router is typically effected by way of, e.g., a MAC address. However, it is possible that the SNA network is configured as a SDLC environment and, as such, the FEP and host communicate with devices via SDLC addresses. In such a heterogeneous network, the router is responsible for mapping addresses of the different networks. Nevertheless, the workstation must be assigned a MAC address in order to communicate with the router over the IP network.

Assignment of a MAC address to a workstation is also an issue where the workstation is coupled to a router via a dial-up communication link; as noted, the workstation is typically only pre-configured with an IP address. If the user of the workstation were to define a virtual MAC address, an intensive administrative effort is required to ensure that the workstation has a unique MAC address.

The present invention is directed to solving the problem of assigning an address to a workstation in an efficient and cost effective manner.

SUMMARY OF THE INVENTION

The invention comprises an address resolution protocol technique that enables an intermediate station of a computer network to dynamically assign an address to an end station for use in a communication session between the end station and other stations of the network. Broadly stated, the end station initiates the session by issuing a novel address assignment request to the intermediate station. In response to the request, the intermediate station assigns the end station an address chosen from a pool of addresses allocated to the intermediate station. If the assigned address is unacceptable, the end station reissues the address assignment request to which the intermediate station allocates another address from the pool.

In the illustrative embodiment, the intermediate station is a router coupled to an Internet protocol (IP) network and the address assigned to the end station, e.g., a physical unit emulator such as a workstation, is a media access control (MAC) address. The router is further connected to other stations through a Systems Network Architecture network to form a heterogeneous network environment. Notably, the workstation and router communicate via a client/server model whereby the workstation (i.e., the "client") initiates and coordinates the requests that are performed by the router (the "server").

According to the inventive protocol technique, novel client and server address resolution modules are implemented on the workstation and router, respectively, for purposes of assigning and resolving allocated MAC addresses prior to establishing the communication session, e.g., a connection-oriented session. Assignment of the address is preferably effected by a capability exchange request that is either multicasted or directed. A directed capability exchange request is one that is issued by the workstation directly to a particular router; in this case, the router's IP address is pre-configured with the workstation. On the other hand, the multicast capability exchange request is issued to a plurality of routers; here, the first router responding to the request is the one used to establish the session with the workstation.

An advantage of the inventive protocol technique is the assignment of addresses in an efficient and cost-effective manner that is devoid of complex configuration requirements. Moreover, the client/server model used for communication between the workstation and router enables extension of the dynamic address assignment principles to different physical network hardware platforms and communications architecture protocols.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 6 is a flowchart illustrating the steps of the address resolution protocol of the present invention.

DETAILED DESCRIPTION OF ILLUSTRATIVE EMBODIMENT

Figure 2:
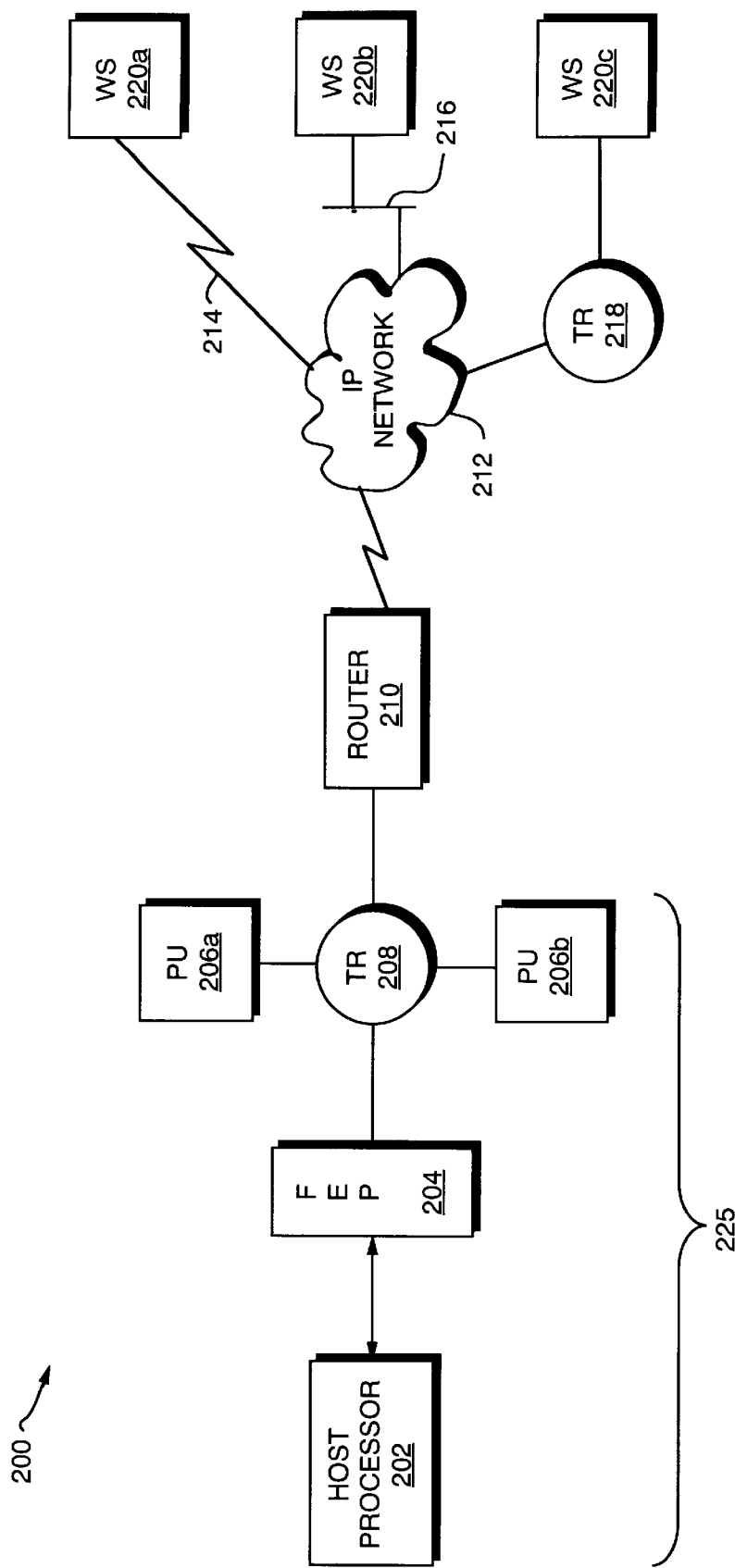
FIG. 2 is a block diagram of a computer network, including a collection of interconnected subnetworks and communication links on which the present invention may advantageously operate.

FIG. 2 is a block diagram of a computer network 200 comprising a collection of interconnected communication links and subnetworks attached to a plurality of stations. The stations are typically computers comprising a host processor station 202, a Front End Processor (FEP) communications controller 204, a plurality of Physical Unit (PU) stations 206a, b, an intermediate station 210, and a plurality of end stations 220a through c. In particular, the end stations 220 are preferably PU emulators or workstations and the intermediate station 210 is preferably an Internet protocol (IP) router.

Each station typically comprises a central processing unit (CPU), a memory unit and an input/output (I/O) unit interconnected by a system bus (not shown). The memory unit may comprise storage locations typically composed of random access memory devices, which are addressable by the CPU and I/O unit. An operating system, portions of which are typically resident in memory and executed by the CPU, functionally organizes the stations by, inter alia, invoking network operations in support of software processes executing on the CPU.

The subnetworks included within network 200 are preferably local area networks (LANs) and the communication links include an asynchronous link 214; in the illustrative embodiment of the invention, the LANs are preferably token ring (TR) 208, 218 and Ethernet 216 subnetworks, whereas the link 214 is a dial-up line. Communication channels 214, 216 and 218 are coupled to router 210 via an IP network 212, which may comprise either a LAN and/or a wide-area network (WAN) configuration, such as X.25. Communication among the stations coupled to the channels is typically effected by exchanging discrete data frames or packets specifying medium access control (MAC) addresses of, e.g., source and destination stations.

In the illustrative embodiment of network 200, the PUs 206 communicate with FEP 204 and host 202 using MAC addresses of frames transmitted over TR 208. In an alternate embodiment of the invention, the PUs, FEP and host may be arranged in a Synchronous Data Link Control (SDLC) environment, and communication among these components are determined by specified SDLC addresses. In either case, communication within the SNA network portion 225 is via connection-oriented service sessions between the components.

Figure 3:
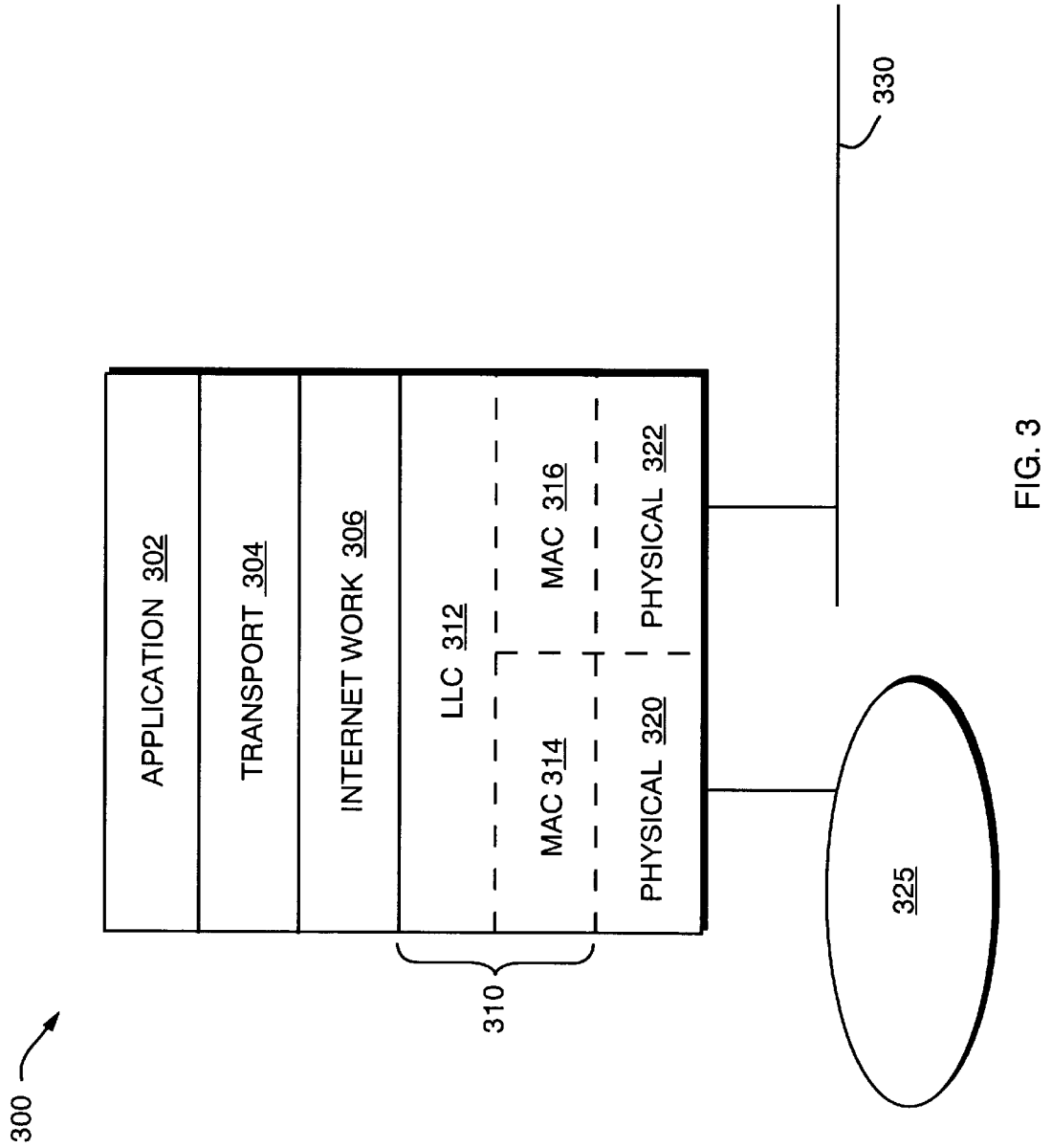
FIG. 3 is a schematic block diagram of the Internet communications architecture protocol stack of FIG. 1 illustrating the interconnection of different LAN media.

Heterogeneous network 200 is formed when router 210 and IP network 212 are introduced between workstations 220 and the traditional SNA components. A key function of the router 210 is to determine the next node to which the frame is sent when coupling different media channels, such as TR 208 and IP network 212. FIG. 3 is a schematic block diagram of protocol stack 300 within router 210 that illustrates the interconnection of two different LAN media 325, 330. Specifically, the channels must have compatible implementations of the Logical Link Control (LLC) sublayer 312. Differences in frame formats and sizes and, in particular, representations of MAC addresses, are handled at the MAC sublayers 314 and 316. If necessary, the router is also responsible for mapping addresses of the different networks. The physical sublayers 320 and 322 specify the electrical, mechanical, procedural and functional specifications for activating, maintaining and de-activating the physical links 325 and 330 between stations of the network.

Protocol stack 300 is preferably a Transmission Control Protocol/Internet protocol (TCP/IP) communications architecture stack, although it will be apparent to those skilled in the art that other architectures (such as NetWare and AppleTalk) may be used in accordance with the principles of the present invention. In the illustrative embodiment, the routing function of router 210 is preferably defined by the IP network protocol contained within the internetwork layer 306. Internetwork layer protocols are generally used to implement connectionless network services that primarily define packet formats; these protocols generally rely on transport protocols, such as TCP contained within the transport layer 304, for connection-oriented, communication sessions. When the layer 306 receives a packet from the transport layer 304 for transmission over the network, it encapsulates the packet with a header containing, inter alia, source and destination IP addresses.

As an example and referring to FIG. 2, assume the host processor station 202 transmits a token ring frame having a destination address of workstation 220c to FEP 204 and over TR 208. The frame is received by router 210 which encapsulates the frame to an IP packet by adding an IP network header to the frame prior to transmitting the packet over IP network 212. Assuming also that there is a second router within the IP network 212, that router decapsulates the packet by stripping the IP header and recovering the token ring frame. The original frame is then is transmitted over TR 218 to the workstation 220c.

Communication among the workstation and router of heterogeneous network 200 is preferably directed via MAC addresses within the frames or packets. However, it is possible that the workstation has not been assigned such an address, particularly if the workstation is coupled to the router via a dial-up communication link. In this case, workstation 220a is configured only with an IP address. If the user of the workstation were to define a virtual MAC address, an intensive administrative effort is required to ensure that the MAC address is unique. Moreover, if the SNA network is configured as a SDLC environment with communication among the components defined by SDLC addresses, the workstation must also be assigned a MAC address in order to communicate with the router over the IP network.

According to the present invention, an address resolution protocol technique is provided that enables an intermediate station, such as router 210, of the heterogeneous network 200 to dynamically assign an address to an end station, such as workstation 220a, for use in a communication session between the workstation and the host station 202. In order to continue the end-to-end reliable services required by the SNA network 225, the router communicates with the workstation 220a via a connection-oriented session. The session between the router and workstation is preferably established in accordance with a client/server computing model wherein the workstation (or client) submits a service request to the router is (or server), which responds by performing the service requested.

Broadly stated, the workstation initiates the session by issuing a novel address assignment request to the router. In response to the request, the router assigns the workstation an address chosen from a pool of addresses allocated to the router. If the assigned address is unacceptable, the workstation reissues the address assignment request to which the router reallocates another address from the pool. Novel client and server modules are implemented on the workstation and router, respectively, for purposes of assigning and resolving allocated MAC addresses prior to establishing the connection-oriented communication session.

Figure 4:
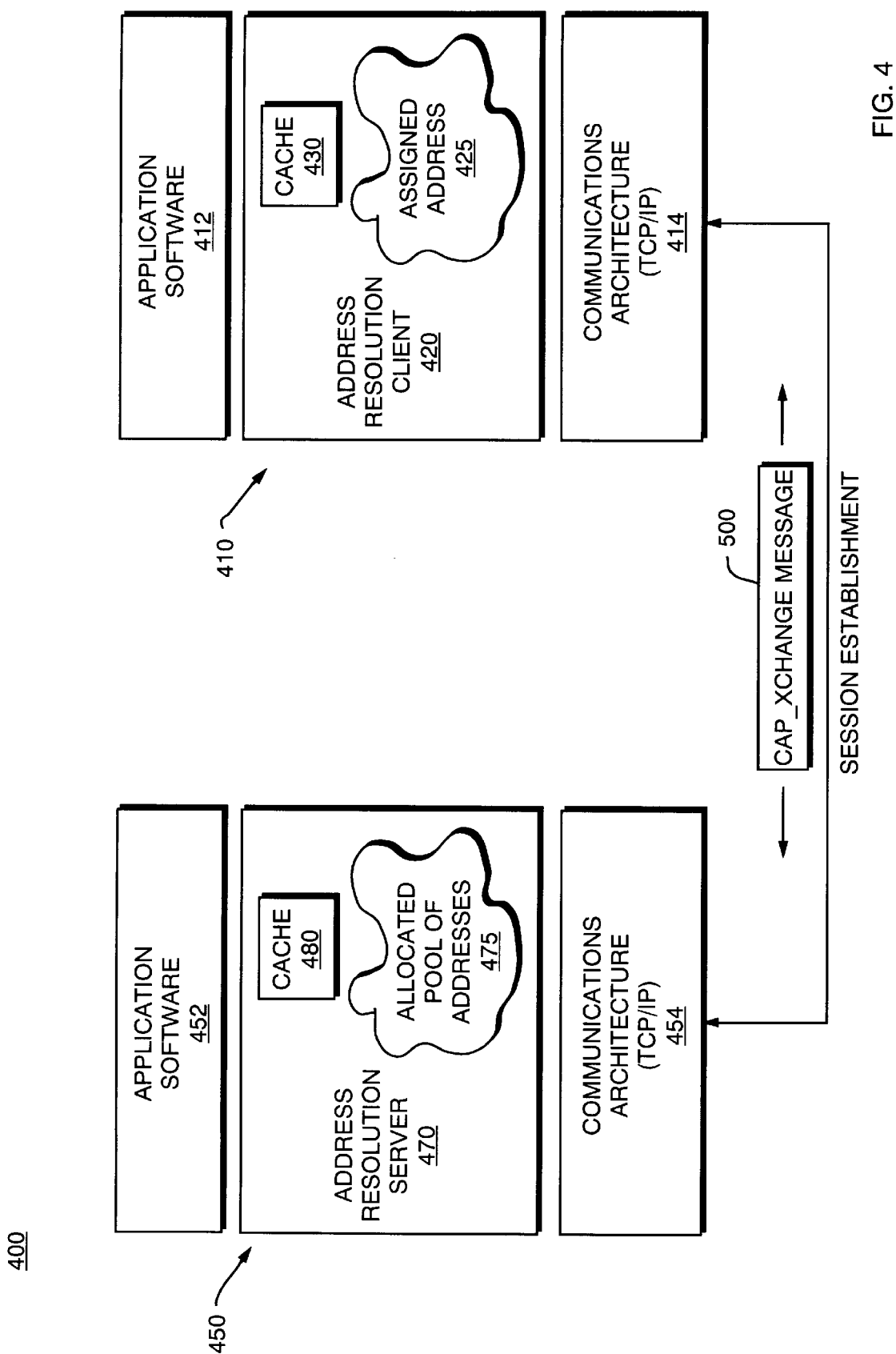
FIG. 4 is a schematic diagram of the internal architecture of a workstation and router of the computer network of FIG. 2 interacting to establish a connection-oriented communication session in accordance with an address resolution protocol technique of the present invention.

FIG. 4 is a schematic diagram of the internal architecture 400 of a workstation 410 and a router 450 interacting to establish a connection-orientedcommunication session. As can be seen, the client and server modules are preferably embedded between upper and lower layers of a communications architecture protocol stack. Specifically, the workstation 410 comprises an address resolution client module 420 coupled between application software module 412 and lower communications architecture module 414. Similarly, router 450 comprises an address resolution server module 470 interconnecting software module 452 and communications architecture module 454. As described further herein, the address resolution server module 470 contains a pool of MAC addresses 475, which are allocated by a network systems administrator; a selected one of these addresses is provided to the address resolution client module as assigned address 425.

Figure 1:
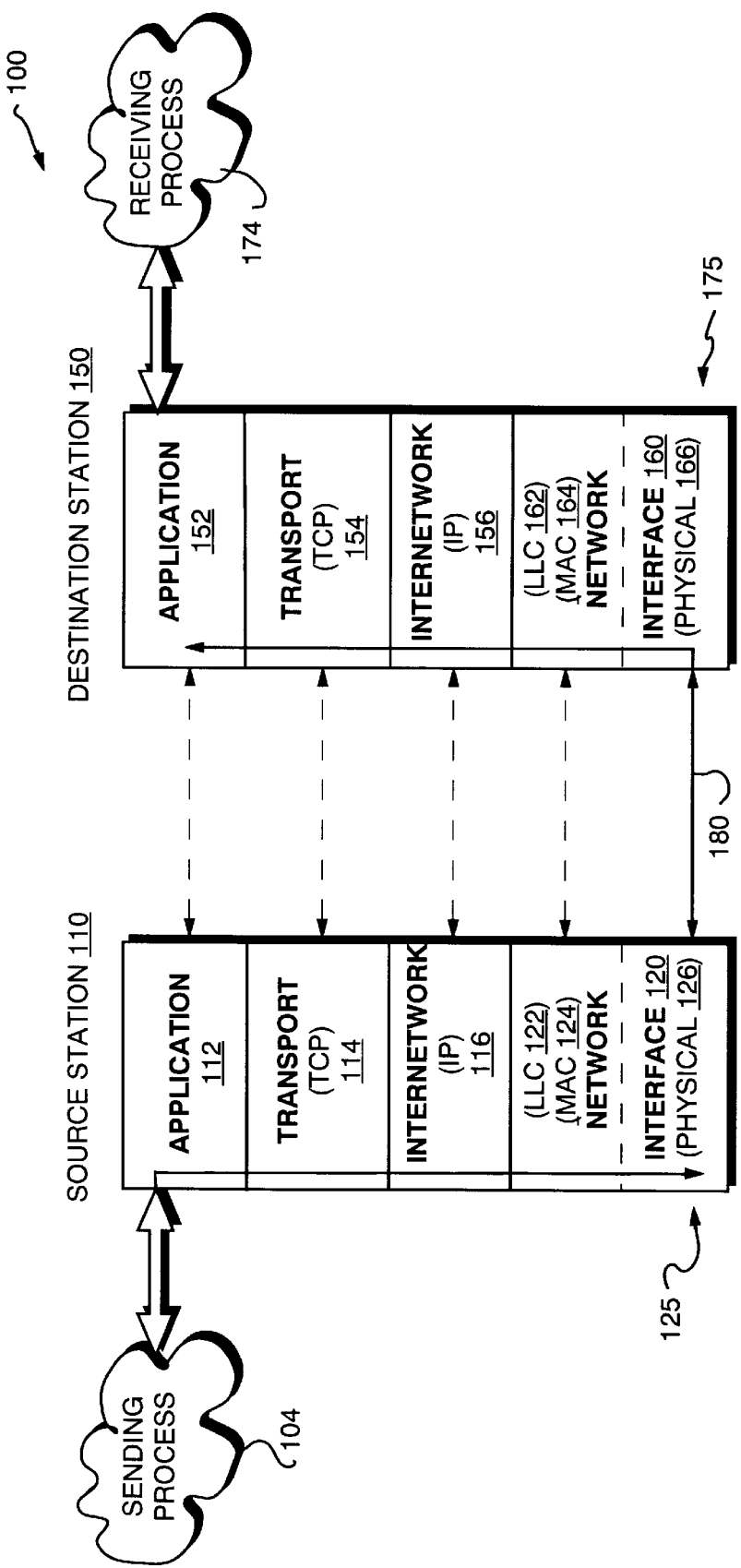
FIG. 1 is a schematic block diagram of prior art communications architecture protocol stacks, such as the Internet protocol stack, used to transmit data between stations of a computer network.

In the illustrative embodiment, the communications architecture stacks 410, 450 are preferably TCP/IP protocol stacks, with the lower network interface layer 120 (FIG. 1) configured to interface with a variety of LAN, WAN and point-to-point link implementations, including Ethernet, token ring, X.25 and, of course, dial-up lines. Furthermore, the communication session established between the workstation and router is preferably a TCP session, although it is understood that other connection-oriented transport protocols, such as AppleTalk Transaction Protocol (ATP) or Internet packet exchange (IPX) protocol, may be used with the novel address resolution protocol described herein.

Figure 5:
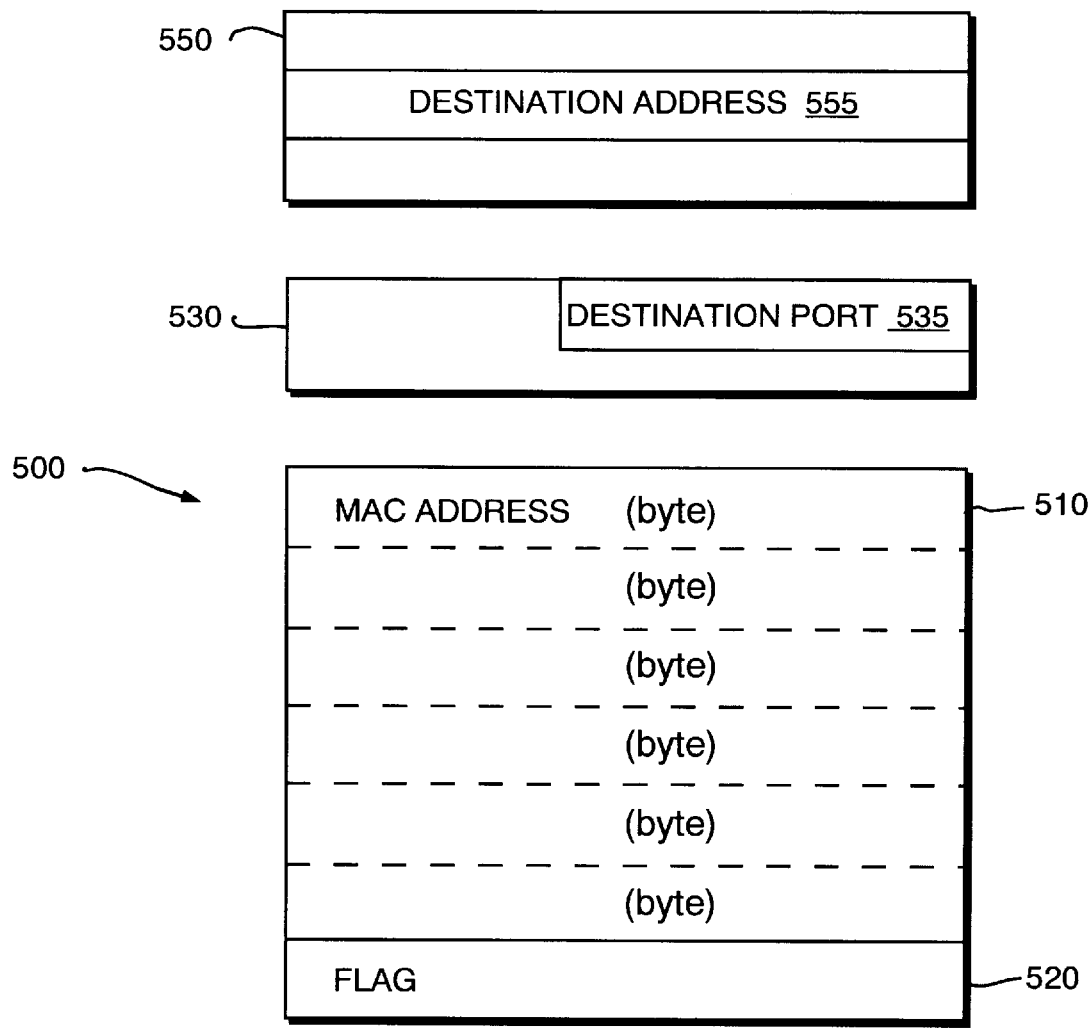
FIG. 5 is a schematic block diagram of the format of a capability exchange (cap_xchange) message used in accordance with the novel address resolution protocol technique.

According to an aspect of the invention, assignment of the address is effected by a capability exchange request that is either directed or multicasted. The novel capability exchange request is preferably manifested as a cap_xchange message 500 that, if directed, is issued by the address resolution client module 420 to a particular address resolution server module 470. FIG. 5 is a schematic block diagram of the format of the capability exchange (cap_xchange) message 500. As noted, the message 500 is an integral part of an address resolution protocol technique used to exchange information, such as a MAC address, between a client and a server. Using the cap_xchange message, the client can either specify its own MAC address (via a cap_xchange command message) or request that the server assign it one (via a cap_xchange response message). In either case, the formats of the command and response message frames are the same, and the server's IP address must be pre-configured on the client. A multicasted capability exchange request, on the other hand, is issued by a client to a plurality of servers; again, the IP addresses of each server must be pre-configured on the client. The first server responding to the request is the one chosen to establish the session with the client.

The cap_xchange message 500 contains a 6-byte MAC address field 510 and a flag field 520 that specifies the transport capability of the server. A MAC address is loaded into the field 510 by the client if it has previously been assigned; otherwise, the server loads an assigned address into the field. The address resolution protocol described herein sets forth the interactive exchanges between the client and server when assigning and resolving assignment of the address.

As noted, the IP address of the router (server) must be preconfigured in the workstation (client) prior to initiating a connection-oriented session. Configuration of the IP address may be accomplished via conventional IP techniques, such as with the use of the negotiation phase of point-to-point (PPP) which allows the workstation to determine an acceptable IP address. In the illustrative embodiment, that IP address is preferably loaded into a destination address field 555 of an IP header 550 that is appended to the cap_xchange message 500 as the message descends the communications protocol stack 414 (FIG. 4) of the client. Since the illustrative stack is a TCP/IP protocol stack, a TCP header 530 encapsulates the message 500 prior to the appended IP header 550. A unique value is further loaded into a destination port field 535 of the header 530 by the client; this unique value specifies the novel address resolution server module 470 receiving the message 500 for purposes of executing the address resolution protocol.

FIG. 6 is a flowchart illustrating the steps of the address resolution protocol of the present invention. The sequence starts at Step 600 and proceeds to Step 602 where the client generates an address assignment request (i.e., cap_xchange message) for transmission to the server. In Step 604, the client determines whether it has previously been assigned a MAC address; if so, that address is loaded into the field 510 of the cap-xchange message and sent to the server at Step 606. When the server receives the cap_xchange message 500 with a MAC address loaded in field 510, it verifies that the address is unique at Step 608; if it is, that address is recorded in, e.g., a local cache location 480, at Step 610. Since the address is acceptable, the server returns the cap_xchange (response) message with the MAC address supplied by the client at Step 612 and the sequence ends at Step 630.

If the client does not have its own MAC address (Step 604), the field 510 of the cap_xchange message 500 is set to a null value, e.g., zero, by the client and the message is transmitted to the server at Step 614. In response to receipt of the message, the server assigns a MAC address from as the allocated pool 475 of addresses at Step 616 and the assigned address is loaded into field 510 of a cap_xchange (command) message 500 at Step 618. Similarly, if the MAC address is determined not to be unique at Step 608, the server assigns another MAC address to the client from the allocated pool 475 of addresses (Step 616) and loads that address into the cap_xchange message at Step 618.

In both cases, the client examines the assigned address to determine if it is acceptable at Step 620. If so, the client records the assigned address 425 in, e.g., cache 430, at Step 622 and acknowledges receipt and acceptance of that address by returning a response cap-xchange message with the assigned MAC address at Step 624. The sequence then ends at Step 630. If the client does not accept the assigned address at Step 620, another cap_xchange message with the MAC address field set to the null s value is sent to the server at Step 626. In response to this subsequent message, the server "returns" the previously assigned address to the pool 475 at Step 628 and assigns yet another, different MAC address to the client at Step 616. The sequence then continues as previously described until it terminates at Step 630.

A significant advantage of the address resolution protocol technique is the dynamic assignment of addresses in an efficient and cost-effective manner that is devoid of complex configuration requirements. That is, by enabling a network systems administrator to pre-configure a range of acceptable MAC addresses on the server module, the interactive assignment and resolution exchange of the inventive protocol eliminates the burden of defining a unique MAC address that is otherwise the responsibility of the user client. In addition, the client/server model used for communication between the workstation and router enables extension of the dynamic address assignment principles to different physical network hardware platforms and communications architecture protocols.

While there has been shown and described an illustrative embodiment for dynamically assigning an address to a client station for use in a communication session using an address resolution protocol technique between a server station and the client, it is to be understood that various other adaptations and modifications may be made within the spirit and scope of the invention. For example in an alternate embodiment of the invention, the server may initiate the session by sending a directed capability exchange request to the client. In this embodiment, the roles of the client (workstation) and server (router) are reversed, and the workstation must pre-register both its MAC and IP addresses on the router.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. Apparatus for dynamically assigning addresses to stations of a computer network, said addresses being for identifying said stations to each other in said network the apparatus comprising:

an end station coupled to the computer network, the end station comprising means for generating an address assignment request and means for issuing the address assignment request over the network to initiate a communication session; and an intermediate station coupled to the computer network and having a pool of addresses allocated thereto, the intermediate station comprising means for assigning the end station an address chosen from the pool in response to the request, such that if the assigned address is unacceptable, the end station reissues the address assignment request to which the intermediate station allocates another address from the pool.

2. The apparatus of claim 1 wherein the end station is a workstation, and wherein the means for generating the address assignment request is an address resolution client module of the workstation.

3. The apparatus of claim 2 wherein the means for issuing the address assignment request comprises the address resolution client module cooperating with a communications architecture of the workstation.

4. The apparatus of claim 3 wherein the communications architecture comprises a transmission control protocol/Internet protocol (TCP/IP) protocol stack.

5. The apparatus of claim 4 wherein the intermediate station is a router, and wherein the means for assigning the address is an address resolution server module of the router.

6. The apparatus of claim 5 wherein the address is a media access control address and wherein the address assignment request is a capability exchange request used to exchange information between the workstation and router.

7. The apparatus of claim 6 wherein the communication session is a connection-oriented session.

8. The apparatus of claim 7 wherein the connection-oriented session is a TCP session.

9. A method for dynamically assigning a media access control (MAC) address from a router to a workstation of a computer network, said MAC address being for uniquely identifying said workstation to said router in said network the method comprising the steps of:

(A) issuing a capability exchange request message from the workstation to the router, the request having a null value loaded into an address field thereof;

(B) at the router, (i) assigning the workstation a MAC address chosen from a pool of addresses allocated to the router, (ii) loading the assigned MAC address into the address field of the capability exchange message and (iii) transmitting the message to the workstation; and one of, (C) reissuing the capability exchange request message from the workstation to the router with the null value loaded into the address field if the assigned MAC address is unacceptable to the workstation; and (D) acknowledging receipt and acceptance of the assigned MAC address by issuing a capability exchange response message from the workstation to the router with the assigned MAC address loaded into the address field.

10. A system for dynamically assigning a media access control (MAC) address to a workstation of a heterogeneous computer network for use in a communications session between the workstation and a host station of the network, the system comprising:

a plurality of first stations coupled to first network, the first stations including the host station;

a plurality of second stations coupled to a second network, the second stations including the workstation configured as a client for issuing a capability exchange request over the second network; and a router interconnecting the first and the second networks, the router being configured as a server having a pool of allocated MAC addresses for assigning the workstation a specific MAC address in response to the capability exchange request said specific MAC address being for uniquely identifying said workstation in said heterogeneous computer network;

wherein said workstation is configured to issue another capability exchange request if said specific MAC address is unacceptable and said router is configured to assign to the workstation another specific MAC address in response to said another capability exchange request.

11. The system of claim 10 wherein the first network is a Systems Network Architecture network and wherein communication among the first stations is determined on the basis of Synchronous Data Link Control addresses.

12. The system of claim 10 wherein the first network is a Systems Network Architecture network and wherein communication among the first stations is determined on the basis of MAC addresses.

13. The system of claim 12 wherein the second network is an Internet protocol (IP) network comprising one of a local area network, a wide area network and an asynchronous communications link.

14. The system of claim 13 wherein the asynchronous communications link is a dial-up line and wherein communication between the workstation and router is determined on the basis of one of a MAC address or IP address.

15. A method of dynamically assigning an address to an end station of a computer network so as to permit unique identification of said end station using said address, the method comprising the steps of:

receiving from the end station an address assignment message containing an ads address field from the end station over the computer network and providing a received address assignment messaged indicative thereof;

checking said address field of said received address assignment message to determine if an address value loaded in said address field is unique;

if said address value is not unique (1) selecting a unique address value from plurality of available unique address values; and (2) loading said selected unique address into an address field of a response message and transmitting said response message to the end station over the computer network.

16. The method of claim 15 further comprising the step of again receiving said address assignment message from the end station with a null value loaded into said address field if said selected unique address is unacceptable to the end station.

17. The method of claim 16 further comprising the step of acknowledging receipt and acceptance of the assigned address by receiving said address assignment message with said selected unique address loaded into the address field.

18. A method for dynamically assigning an address from an intermediate station to an end station of a computer network, the method comprising the steps of:

(A) generating an address assignment message at the end station;

(B) determining whether an address has been previously assigned to the end station;

(C) issuing the address assignment message from the end station to the intermediate station and one of (i) if an address has not been previously assigned, loading a null value into an address field of the message and (ii) if an address has been previously assigned, loading the address value into the address field of the message;

(D) at the intermediate station, one of (iii) assigning the end station an address chosen from a pool of addresses allocated to the intermediate station if the address field contains the null value, and (iv) determining whether the previously assigned address is unique if the address field contains the assigned address; and (E) loading the assigned address value into the address field of the address assignment message and transmitting the message to the end station if the address is assigned and unique.

19. The method of claim 18 further comprising the step of (F) reissuing the address assignment message from the end station to the intermediate station with the null value loaded into the address field if the assigned address is unacceptable to the end station.

20. The method of claim 19 further comprising the step of (G) acknowledging receipt and acceptance of the assigned address by issuing the address assignment message from the end station to the intermediate station with the assigned address loaded into the address field.

21. The method of claim 20 wherein the address is at media access control address.

22. The method of claim 21 wherein the address assignment message of step (C) is a capability exchange request message.

23. The method of claim 22 wherein the address assignment message of step (E) is a capability exchange response message.

* * * * *